United States Patent
Inagaki et al.

(10) Patent No.: US 8,680,398 B2
(45) Date of Patent: Mar. 25, 2014

(54) COMPOSITION FOR A FLAME-RETARDANT SILANE-CROSSLINKED OLEFIN RESIN, AN INSULATED WIRE INCLUDING THE SAME, AND A METHOD FOR PRODUCING A FLAME-RETARDANT SILANE-CROSSLINKED OLEFIN RESIN

(75) Inventors: Tomonori Inagaki, Yokkaichi (JP); Masashi Kimura, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 440 days.

(21) Appl. No.: 12/451,672

(22) PCT Filed: Jul. 14, 2008

(86) PCT No.: PCT/JP2008/062664
§ 371 (c)(1),
(2), (4) Date: Nov. 24, 2009

(87) PCT Pub. No.: WO2009/008537
PCT Pub. Date: Jan. 15, 2009

(65) Prior Publication Data
US 2010/0163272 A1    Jul. 1, 2010

(30) Foreign Application Priority Data
Jul. 12, 2007  (JP) .................................. 2007-183517

(51) Int. Cl.
    *H01B 7/00* (2006.01)
(52) U.S. Cl.
    USPC .............. 174/110 R; 174/120 R; 174/120 SC
(58) Field of Classification Search
    USPC ..................... 174/36, 110 R, 120 R, 121 R, 174/121 A–120 SR
    See application file for complete search history.

(56) References Cited

U.S. PATENT DOCUMENTS

| 4,732,939 | A |   | 3/1988 | Hoshi et al. |
| 5,492,760 | A | * | 2/1996 | Sarma et al. ................... 428/378 |
| 5,919,565 | A | * | 7/1999 | Gross ............................ 428/379 |
| 5,929,129 | A | * | 7/1999 | Feichtinger ................... 521/134 |
| 2002/0197471 | A1 | * | 12/2002 | Barnes et al. ................. 428/343 |
| 2010/0132974 | A1 |   | 6/2010 | Inagaki et al. |

FOREIGN PATENT DOCUMENTS

| EP | 0803530 A2 * | 10/1997 | ................ C08J 3/24 |
| JP | A-62-285943 | 12/1987 | |
| JP | A-09-076429 | 3/1997 | |
| JP | A-11-255977 | 9/1999 | |
| JP | A-2000-212291 | 8/2000 | |
| JP | A-2004-530015 | 9/2004 | |
| JP | 2006-182875 A * | 7/2006 | ............. C08L 23/08 |
| JP | A-2006-182875 | 7/2006 | |
| JP | A-2007-070602 | 3/2007 | |
| JP | A-2008-027592 | 2/2008 | |
| WO | WO 2006/118253 A1 | 11/2006 | |

OTHER PUBLICATIONS

International Search Report issued in International Application No. PCT/JP2008/062664 on Sep. 16, 2008.
German Office Action issued in Application No. 11 2008 001 781.6; Dated Apr. 18, 2011 (With Translation).
Oct. 20, 2011 Office Action issued in Chinese Patent Application No. 200880024374.X (with translation).
Oct. 30, 2012 Japanese Office Action issued in JP-2009-522695 with English-language Translation.
Nov. 13, 2012 German Office Action issued in German Application No. 11 2008 001 781.6 (with English-language Translation).
Nov. 18, 2013 Summons for Hearing issued in German Patent Application No. 112008001781.6 (with translation).

* cited by examiner

*Primary Examiner* — William H Mayo, III
(74) *Attorney, Agent, or Firm* — Oliff PLC

(57) ABSTRACT

A composition for a flame-retardant silane-crosslinked olefin resin, an insulated wire including the same, and a method for producing a flame-retardant silane-crosslinked olefin resin. The composition contains silane-grafted polyethylene made by graft polymerization of very low-density polyethylene having a density of 0.880 to 0.895 g/cm$^3$ with a silane coupling agent, a polypropylene elastomer, metal hydroxide, and a silane crosslinking catalyst. The method includes the steps of kneading a batch containing silane-grafted polyethylene, a batch containing a polypropylene elastomer and metal hydroxide, and a batch containing an olefin resin and a silane crosslinking catalyst, molding a composition of the kneaded batches, and subjecting the molded composition to water crosslinking.

11 Claims, No Drawings

COMPOSITION FOR A FLAME-RETARDANT SILANE-CROSSLINKED OLEFIN RESIN, AN INSULATED WIRE INCLUDING THE SAME, AND A METHOD FOR PRODUCING A FLAME-RETARDANT SILANE-CROSSLINKED OLEFIN RESIN

TECHNICAL FIELD

The present invention relates to a composition for a flame-retardant silane-crosslinked olefin resin, an insulated wire including the same, and a method for producing a flame-retardant silane-crosslinked olefin resin, and more specifically relates to a composition for a flame-retardant silane-crosslinked olefin resin which is favorably used as a covering material of an insulated wire to be used for wiring in an automobile or an electrical/electronic appliance, an insulated wire including the same, and a method for producing a flame-retardant silane-crosslinked olefin resin.

BACKGROUND ART

Conventionally, for an insulated wire used in carrying out wiring of vehicle parts for an automobile and parts for an electrical/electronic appliance, an insulated wire is in widespread use in which a vinyl chloride resin composition prepared by adding a halogenous flame retardant thereto covers a conductor.

However, there is a problem that this kind of vinyl chloride resin composition contains halogen elements, so that it emits harmful halogenous gas into the atmosphere in case of car fire or at the time of disposing of the electrical/electronic appliance by incineration, causing environmental pollution.

Therefore, from the view point of reducing loads on the global environment, the vinyl chloride resin composition has been recently replaced with an olefin resin composition which contains an olefin resin such as polyethylene. The olefin resin is combustible, so that metal hydroxide such as magnesium hydroxide is added as a flame retardant to the olefin resin composition in order to secure sufficient flame retardancy.

When an insulated wire in which such an olefin resin composition covers a conductor is used in high temperature environment such as an automobile, heat resistance is required of the insulated wire. Hence, in order to improve heat resistance of the insulate wire, an insulating layer of the insulated wire is often subjected to a crosslinking treatment.

Examples of a method of the crosslinking treatment include an electron irradiation crosslinking method, a chemical crosslinking method and a water crosslinking method. Among them, the electron irradiation crosslinking method and the chemical crosslinking method need special crosslinking apparatuses which are high in cost and large in size, which leads to a problem of increased cost. Hence, the water crosslinking method which is free from such a problem and allows easy crosslinking has recently been in widespread use.

In addition, when an insulated wire in which such an olefin resin composition covers a conductor is used for interior wiring in an automobile or a building, flexibility is required of the insulated wire to facilitate the wiring. Especially in a case where metal hydroxide such as magnesium hydroxide is added as a flame retardant to the olefin resin composition, more flexibility is required of the insulated wire because a covering material of the insulated wire becomes hard.

In order to satisfy the requirements described above, Japanese Patent Application Unexamined Publication No. Hei 11-255977 discloses a flexible polyethylene resin composition which contains linear low-density polyethylene made by polymerization using a metallocene catalyst, and a silane crosslinking agent, and a flexible polyethylene resin composition which contains an ethylene copolymer such as an ethylene-ethylacrylate copolymer and an ethylene-vinyl acetate copolymer in addition to the above-described linear low-density polyethylene and silane crosslinking agent.

DISCLOSURE OF THE INVENTION

Problem to be Solved by the Invention

It is to be noted that gasoline resistance which is a property of not easily swelling with gasoline or engine oil is stipulated for an insulated wire to be used in an automobile, so that excellent gasoline resistance is also required of the insulated wire.

However, the flexible, polyethylene resin composition disclosed in Japanese Patent Application Unexamined Publication No. Hei 11-255977 has a problem in gasoline resistance resulting from the high degree of swelling with gasoline or engine oil because the composition contains a functional group which has a high degree of solubility in gasoline.

An object of the present invention is to provide a composition for a flame-retardant silane-crosslinked olefin resin which is excellent in flexibility and gasoline resistance, an insulated wire including the same, and a method for producing a flame-retardant silane-crosslinked olefin resin which is excellent in flexibility and gasoline resistance.

Means for Solving Problem

To achieve the objects and in accordance with the purpose of the present invention, a composition for a flame-retardant silane-crosslinked olefin resin according to a preferred embodiment of the present invention contains silane-grafted polyethylene which is made by graft polymerization of very low-density polyethylene having a density of 0.880 to 0.895 g/cm$^3$ with a silane coupling agent, a polypropylene elastomer, metal hydroxide, and a silane crosslinking catalyst.

It is preferable that the metal hydroxide content is 50 to 250 parts by mass with respect to 100 parts by mass of an olefin resin component which is constituted of 45 to 85% by mass of the silane-grafted polyethylene which is made by the graft polymerization of the very low-density polyethylene having the density of 0.880 to 0.895 g/cm$^3$ with the silane coupling agent, and 20 to 4% by mass of the polypropylene elastomer, and the silane crosslinking catalyst content is 0.05 to 0.35 parts by mass with respect to 100 parts by mass of the olefin resin component.

It is preferable that the olefin resin component further contains one or more than one kind of very low-density polyethylene having a density of 0.880 to 0.895 g/cm$^3$.

The very low-density polyethylene is preferably metallocene polyethylene.

The very low-density polyethylene preferably has a melt flow rate (MFR) in the range of 0.5 to 5 (g/10 min), and a molecular weight distribution (Mw/Mn) in the range of 2.7 to 3.5.

The composition further contains 1 to 5 parts by mass of a silicone oil with respect to 100 parts by mass of the olefin resin component.

In another aspect of the present invention, an insulated wire according to a preferred embodiment of the present invention includes the composition for a flame-retardant silane-crosslinked olefin resin, and a conductor which is covered with the composition.

Yet, in another aspect of the present invention, a method for producing a flame-retardant silane-crosslinked olefin resin according to a preferred embodiment of the present invention includes the steps of kneading a batch containing silane-grafted polyethylene which is made by graft polymerization of very low-density polyethylene having a density of 0.880 to 0.895 g/cm$^3$ with a silane coupling agent in the presence of a free-radical generating agent, a batch which is prepared by mixing a mixture of very low-density polyethylene having a density of 0.880 to 0.895 g/cm$^3$ and a polypropylene elastomer or a polypropylene elastomer and metal hydroxide as a flame retardant, and a batch which is prepared by mixing an olefin resin and a silane crosslinking catalyst, molding a composition of the kneaded batches, and subjecting the molded composition to water crosslinking.

In this method, it is preferable that amass ratio of the flame retardant-containing batch to the silane-grafted polyethylene-containing batch is in the range of 50:50 to 80:20, and the catalyst-containing batch content is in the range of 2.5 to 10 parts by mass with respect to 100 parts by mass of a component constituted of the silane-grafted polyethylene-containing batch and the flame retardant-containing batch.

In addition, in the method, it is preferable that the silane-grafted polyethylene-containing batch is prepared by heat-mixing the very low-density polyethylene, the silane coupling agent and the free-radical generating agent, the silane coupling agent content being 1 to 5 parts by mass with respect to 100 parts by mass of the very low-density polyethylene, and the free-radical generating agent content being 0.05 to 0.3 parts by mass with respect to 100 parts by mass of the very low-density polyethylene, that the flame retardant-containing batch is prepared by mixing the mixture or the polypropylene elastomer and the metal hydroxide, the metal hydroxide content being 100 to 900 parts by mass with respect to 100 parts by mass of the mixture or the polypropylene elastomer, and that the catalyst-containing batch is prepared by mixing the olefin resin and the silane crosslinking catalyst, the silane crosslinking catalyst content being 1 to 5 parts by mass with respect to 100 parts by mass of the olefin resin.

Effects of the Invention

Since the composition for a flame-retardant silane-crosslinked olefin resin according to the preferred embodiment of the present invention contains the silane-grafted polyethylene which is made by the graft polymerization of the very low-density polyethylene having the density of 0.880 to 0.895 g/cm$^3$ with the silane coupling agent, the polypropylene elastomer, the metal hydroxide and the silane crosslinking catalyst, the composition is excellent in flexibility, and has a small degree of swelling with gasoline or other oils and is accordingly excellent also in gasoline resistance.

If the contents of the silane-grafted polyethylene, the polypropylene elastomer, the metal hydroxide and the silane crosslinking catalyst are respectively in their ranges, the composition is further excellent in the above-described properties.

If the olefin resin component further contains the one or more than one kind of very low-density polyethylene having the density of 0.880 to 0.895 g/cm$^3$, the olefin resin component mixes better.

If the very low-density polyethylene is the metallocene polyethylene, the composition is excellent in flexibility.

If the very low-density polyethylene has the melt flow rate (MFR) in the range of 0.5 to 5 (g/10 min), extrusion molding of the composition is enhanced, which improves surface appearance of an extrusion.

If the very low-density polyethylene has the molecular weight distribution (Mw/Mn) in the range of 2.7 to 3.5, asperities are hardly formed on an extrusion at the time of extrusion molding, and accordingly the surface appearance of the extrusion successively displays good finished quality.

If the composition further contains 1 to 5 parts by mass of the silicone oil with respect to 100 parts by mass of the olefin resin component, the composition improves in wear resistance.

Meanwhile, since the insulated wire according to the preferred embodiment of the present invention includes the composition for a flame-retardant silane-crosslinked olefin resin and the conductor which is covered with the composition, the insulated wire is excellent in flexibility and gasoline resistance.

Meanwhile, since the method for producing a flame-retardant silane-crosslinked olefin resin according to the preferred embodiment of the present invention includes the steps of kneading the silane-grafted polyethylene-containing batch, the flame retardant-containing batch which contains the polypropylene elastomer, and the catalyst-containing batch, molding the composition of the kneaded batches, and subjecting the molded composition to the water crosslinking, the produced resin is excellent in flexibility and gasoline resistance.

In this method, since the polypropylene elastomer is contained in the flame retardant-containing batch, not in the silane-grafted polyethylene-containing batch, the polypropylene elastomer is free from influence of the free-radical generating agent. In other words, the polypropylene elastomer is contained in a resin composition without being decomposed by the free-radical generating agent, which helps the resin composition to improve in flexibility and gasoline resistance.

In this method, if the mass ratio of the silane-grafted polyethylene-containing batch, the flame retardant-containing batch, and the catalyst-containing batch is in the above described ranges, the resin composition is more excellent in flexibility and gasoline resistance.

In addition, in this method, if the silane-grafted polyethylene-containing batch, the flame retardant-containing batch, and the catalyst-containing batch respectively have the above-described composition, and the above-described content ratios, the resin composition is excellent with reliability in flexibility and gasoline resistance.

BEST MODE FOR CARRYING OUT THE INVENTION

A detailed description of preferred embodiments of the present invention will now be provided.

A composition for a flame-retardant silane-crosslinked olefin resin according to the preferred embodiment of the present invention contains silane-grafted polyethylene, a polypropylene elastomer, metal hydroxide and a silane crosslinking catalyst.

The silane-grafted polyethylene shall make up a high heat resistant resin by being silane crosslinked by water in the presence of the silane crosslinking catalyst. The silane-grafted polyethylene is made by graft polymerization of very low-density polyethylene with a silane coupling agent in the presence of a free-radical generating agent. For example, the graft polymerization of the very low-density polyethylene with the silane coupling agent is made by first adding the silane coupling agent and the free-radical generating agent to the very low-density polyethylene, and then heat-kneading and extruding thus-prepared very low-density polyethylene with the use of an extruder. It is essential only that the very low-density polyethylene should be heated at a temperature no less than a temperature at which the free-radical generating agent is decomposed, and the heating temperature is accordingly determined by the kind of the used free-radical generating agent as appropriate.

The silane-grafted polyethylene content is preferably in the range of 45 to 85% by mass and more preferably in the range of 60 to 70% by mass of the olefin resin component in the composition. If the content is less than 45% by mass, it is difficult for the composition to obtain a sufficient degree of cross-linkage, so that heat resistance of the composition is easily lowered. On the other hand, if the content is more than 85% by mass, the content of the ingredients other than the silane-grafted polyethylene included in the olefin resin component is too small, which makes it difficult for the metal hydroxide to get to know, before mixed into the silane-grafted polyethylene, the resin ingredients which are not silane grafted. In this case, the silane-grafted polyethylene gets easily hydrolyzed by water contained in the metal hydroxide, so that it is difficult for the composition to obtain a sufficient degree of cross-linkage.

The very low-density polyethylene of which the silane-grafted polyethylene is made is preferably polyethylene which has a density in the range of 0.880 to 0.895 g/cm$^3$.

Table 1 below provides experimental examples showing relations between densities of polyethylenes of which silane-grafted polyethylenes are made, and gasoline resistance of the silane-grafted polyethylenes. The silane-grafted polyethylenes of the experimental examples were prepared by silane-grafting the polyethylenes which have different densities, and measurement of gasoline resistance of the silane-grafted polyethylenes was performed in accordance with ISO6722-11-1. To be specific, the silane-grafted polyethylenes after molded were each immersed in ISO1817 gasoline, and then the silane-grafted polyethylenes were each wound around a stipulated mandrel and checked for cracking.

TABLE 1

| Experimental Example | Polyethylene Density g/cm3 | MFR g/10 min | Gasoline Resistance |
|---|---|---|---|
| 1 | 0.878 | 1 | Cracking observed |
| 2 | 0.879 | 0.8 | Cracking observed |
| 3 | 0.880 | 2 | No cracking observed |
| 4 | 0.885 | 1 | No cracking observed |
| 5 | 0.887 | 0.8 | No cracking observed |
| 6 | 0.893 | 1 | No cracking observed |

Table 1 shows that no cracking is observed in the polyethylenes of which the densities are in the range of 0.880 to 0.895 g/cm$^3$. Hence it is clear from these results that the silane-grafted polyethylenes which were made of these polyethylenes are excellent in gasoline resistance.

Therefore, a resin after crosslinked which is made of polyethylene having a density in the above-described range is excellent in flexibility, and at the same time does not easily swell with gasoline and cracking hardly occurs. This is assumed because of a crystallinity the polyethylene has. To be specific, when the density of the polyethylene becomes lower, the crystallinity decreases and flexibility of the resin accordingly increases while the resin easily swells with gasoline. Meanwhile, when the density of the polyethylene becomes higher, the crystallinity increases and the resin easily gets hard while the resin improves in gasoline resistance. Accordingly, when the polyethylene has the density in the above-described range, the resin is excellent in flexibility and gasoline resistance. Besides, the very low-density polyethylene preferably has a crystallinity of 15% or more because polyethylene having a density of 0.880 g/cm$^3$ has a crystallinity of about 15% when obtained by a density method.

The very low-density polyethylene preferably has a melt flow rate (MFR) in the range of 0.5 to 5 (g/10 min) when measured based on JIS K 6758 (at 230° C. under a load of 2.16 kg) considering that the composition obtains good fluidity and becomes easy to extrusion mold. In addition, the very low-density polyethylene preferably has a molecular weight distribution (Mw/Mn) in the range of 2.7 to 3.5 considering that surface appearance of an extrusion displays good finished quality at the time of extrusion.

The very low-density polyethylene is made by polymerization of ethylene, or by copolymerization of ethylene and alpha-olefin. Suitable alpha-olefin to be copolymerized with ethylene is alpha-olefin with carbon number from 6 to 10, and alpha-olefin such as 1-hexene, 4-methyl-1-pentene, 1-hepten, and 1-octane is especially preferable. In the polymerization, any of a single-site catalyst such as a metallocene catalyst, and a multisite catalyst such as a Ziegler catalyst (e.g., a titanium Ziegler catalyst, a chromium Ziegler catalyst) may be used, while the metallocene catalyst is preferably used.

In general, a metallocene catalyst has a polymerization active site which is single, and accordingly shows high polymerization activity. Hence, a polymer made by polymerization in the presence of the metallocene catalyst forms crystals uniform in size, and accordingly has uniform comonomer composition. In addition, a low density, low molecular weight ingredient, and a high density, high molecular weight ingredient are contained in small amounts in the obtained polymer, so that the polymer has narrow molecular weight distribution. Further, the obtained polymer has features such as a relatively low density. Therefore, the polymer made by polymerization in the presence of the metallocene catalyst is generally excellent in strength such as tensile strength.

Examples of the metallocene catalyst include bis(cyclopentadienyl)zirconium dichloride, bis(cyclopentadienyl)hahnium dichloride, ethylenebis(indenyl)zirconium dichloride, ethylenebis(indenyl)hahnium dichloride, isopropylidene(cyclopentadienyl-9-fluorenyl)zirconium dichloride, isopropylidene(cyclopentadienyl-9-fluorenyl)hahnium dichloride, isopropylidene(cyclopentadienyl-2,7-dimethyl-9-fluorenyl)zirconium dichloride, isopropylidene (cyclopentadienyl-2,7-dimethyl-9-fluorenyl)hahnium dichloride, dimethyl silanediylbis(2,4,5-trimethylcyclopentadienyl)zirconium dichloride, dimethyl silanediylbis(2,4-dimethylcyclopentadienyl)zirconium dichloride, dimethyl silanediylbis (2,4,5-trimethylcyclopentadienyl)hahnium dichloride, and dimethyl silanediylbis(2,4-dimethylcyclopentadienyl)hahnium dichloride, which are not limited thereto, and may be used singly or in combination.

Examples of the silane coupling agent include vinylalkoxysilane such as vinyltrimethoxysilane, vinyltriethoxysilane and vinyltributoxysilane, n-hexyl trimethoxysilane, vinylacetoxysilane, γ-methacryloxypropyltrimethoxysilane, and γ-methacryloxypropylmethyldimethoxysilane. They may be used singly or in combination.

The silane coupling agent content is preferably in the range of 1 to 5 parts by mass and more preferably in the range of 2 to 3 parts by mass with respect to 100 parts by mass of the very low-density polyethylene. If the content is less than 1 part by mass, a grafting amount of the silane coupling agent is small and it is difficult for the composition to obtain a sufficient degree of cross-linkage. On the other hand, if the content is more than 5 parts by mass, melt viscosity of the composition becomes too high and an excessive load is applied on an extruder, which results in decreased workability. Besides, the degree of cross-linkage is preferably 60% or more.

Examples of the free-radical generating agent include an organic peroxide such as dicumyl peroxide (DCP), benzoyl peroxide, dichlorobenzoyl peroxide, di-tert-butyl peroxide, butyl peracetate, tert-butyl perbenzoate, and 2,5-dimethyl-2, 5-di(tert-butyl peroxy).

Among them, dicumyl peroxide (DCP) is preferable. When using dicumyl peroxide (DCP) as the free-radical generating agent, a temperature to prepare a silane-grafted polyethylene-containing batch is preferably set at 200° C. or more in order to make graft polymerization of the very low-density polyethylene with the silane coupling agent.

The free-radical generating agent content is preferably in the range of 0.05 to 0.3 parts by mass and more preferably in the range of 0.1 to 0.2 parts by mass with respect to 100 parts by mass of the very low-density polyethylene.

If the content is less than 0.05 parts by mass, grafting reaction of the silane coupling agent on the very low-density polyethylene tends not to proceed sufficiently, and it is difficult for a resin product to obtain a desired gel content. On the other hand, if the content is more than 0.3 parts by mass, the percentage of molecules of the very low-density polyethylene which are cut becomes large and unintended peroxide crosslinking tends to proceed. In this case, asperities are easily formed on the product surface, which results in decreased workability and marred surface appearance of the product.

The polypropylene elastomer is a copolymer which is made by the polymerization of a propylene component that is a main component with an alpha-olefin component such as ethylene, 1-buten, 1-penten, 1-hexene, 4-methyl-1-pentene, 1-hepten, and 1-octane. The percentage of the alpha-olefin component such as ethylene is preferably 10% by mass or more.

The polypropylene elastomer helps the composition to improve in gasoline resistance. Considering that the polypropylene elastomer further improves in gasoline resistance, the polypropylene elastomer preferably has a melting point of 130° C. or more, and a density in the range of 0.880 to 0.895 g/cm$^3$.

In addition, considering that the polypropylene elastomer improves in flexibility, the polypropylene elastomer preferably has a flexural modulus of 1000 MPa or less and more preferably has a flexural modulus in the range of 300 to 700 MPa. If the flexural modulus is less than 300 MPa, a rubber component in the polypropylene elastomer increases and the composition accordingly swells with gasoline easily.

Examples of the polypropylene elastomer include "NEW-CON NAR6" manufactured by Japan Polypropylene Corporation.

The polypropylene elastomer content is preferably in the range of 4 to 20% by mass of the olefin resin component in the composition and more preferably in the range of 5 to 10% by mass. If the content is less than 4% by mass, the effect of improving gasoline resistance of the composition is easily lowered. On the other hand, if the content is more than 20% by mass, the effect of improving flexibility of the composition is easily lowered.

The metal hydroxide provides the composition with flame retardancy. In order for the composition to obtain a sufficient effect of flame retardancy, the metal hydroxide content is 50 parts by mass or more and more preferably 70 parts by mass or more with respect to 100 parts by mass of the olefin resin component. However, the composition becomes too hard if the content is too large, so that in view of improving flexibility of the composition, the content is preferably 250 parts by mass or less and more preferably 180 parts by mass or less with respect to 100 parts by mass of the olefin resin component.

Examples of the metal hydroxide include magnesium hydroxide, aluminum hydroxide, calcium hydroxide, zirconium hydroxide and barium hydroxide. Among them, magnesium hydroxide and aluminum hydroxide are preferable.

The silane crosslinking catalyst is used for crosslinking the silane-grafted polyethylene in the presence of water to make up a high heat resistant resin. The silane crosslinking catalyst is a silanol condensation catalyst, and examples thereof include a metal carboxylate containing a metal such as tin, zinc, iron, lead and cobalt, a titanate ester, an organic base, an inorganic acid, and an organic acid.

Examples of the silane crosslinking catalyst include dibutyltin dilaurate, dibutyltin dimalate, dibutyltin mercaptide (e.g., dibutyltin bis-octylthioglycolate, a dibutyltin beta-mercaptopropionate polymer), dibutyltindiacetate, dioctyltin dilaurate, tin acetate, tin caprylate, lead naphthenate, cobalt naphthenate, barium stearate, calcium stearate, tetrabutyl titanate, tetranonyl titanate, dibutylamine, hexylamine, pyridine, a sulfuric acid, a hydrochloric acid, a toluenesulfonic acid, an acetate, a stearic acid, and a maleic acid. Among them, dibutyltin dilaurate, dibutyltin dimalate, and dibutyltin mercaptide are preferable.

The silane crosslinking catalyst content is preferably in the range of 0.05 to 0.35 parts by mass and more preferably in the range of 0.1 to 0.35 parts by mass with respect to 100 parts by mass of the olefin resin component. If the content is less than 0.05 parts by mass, the degree of cross-linkage of the composition is easily lowered, and it is difficult for the composition to obtain desired heat resistance. On the other hand, if the content is more than 0.35 parts by mass, a molded product of the olefin resin tends to have marred surface appearance.

The composition for a flame-retardant silane-crosslinked olefin resin according to the preferred embodiment of the present invention is preferable if the olefin resin component further contains one or more than one kind of very low-density polyethylene having a density of 0.880 to 0.895 g/cm$^3$. The one or more than one kind of very low-density polyethylene is polyethylene which is not silane grafted. When the one or more than one kind of very low-density polyethylene have the density of 0.880 to 0.895 g/cm$^3$, the olefin resin component easily mixes.

In addition, it is preferable that the composition for a flame-retardant silane-crosslinked olefin resin according to the preferred embodiment of the present invention further contains a silicone oil. The silicone oil, if contained, forms a silicone layer on the surface of the molded composition at the time of molding, which improves wear resistance of the molded composition. The silicon oil content is preferably in the range of 1 to 5 parts by mass and more preferably in the range of 2 to 3 parts by mass with respect to 100 parts by mass of the olefin resin component. If the content is less than 1 part by mass, the effect of improving wear resistance is low. On the other hand, if the content is more than 5 parts by mass, a sliding property of the composition is enhanced too much and thus makes a screw slippery at the time of kneading the composition, which often brings a problem of a non-constant amount of the extruded composition.

Examples of the silicone oil include a straight silicone oil, a dimethyl silicone oil, a methylphenyl silicone oil, a methyl hydrogen silicone oil and a silicone concentrate. They may be used singly or in combination.

Although the silicone oil may blended as it is when blended into the composition, it is more preferable that the silicone oil is blended as a silicon master pellet which is prepared by impregnating a resin ingredient with the silicone oil in order to improve dispersibility of the silicone oil. In order that the silicone oil mixes well with the olefin resin ingredient, the resin ingredient impregnated with the silicone oil is preferably an olefin resin of the same kind as the resin which is contained in the silane-grafted polyethylene-containing batch. In other words, the olefin resin is preferably very low-density polyethylene having a density in the range of 0.880 to 0.895 g/cm$^3$.

It is preferable that the composition for a flame-retardant silane-crosslinked olefin resin according to the preferred embodiment of the present invention further contains an additive such as an antioxidant, a lubricant, a processing aid, a coloring agent, an inorganic filler and a copper inhibitor as appropriate. The addition of the antioxidant further improves heat resistance. The addition of the lubricant minimizes degradation of workability caused by the addition of the flame retardant to improve workability, and also reduces, when the composition is used, for example, as a covering material of an insulated wire, adhesion of the composition to a conductor of the insulated wire. The addition of the copper inhibitor prevents, when the composition is used, for example, as a covering material of an insulated wire, copper harm brought by copper contained in a conductor of the insulated wire.

Examples of the antioxidant include a phenolic antioxidant, a sulfurous antioxidant and a phosphorus antioxidant. They may be used singly or in combination.

Examples of the phenolic antioxidant include tetrakis [methylene-3-(3,5-di-t-butyl-4-hydroxyphenyl)propionate] methane.

Examples of the sulfurous antioxidant include pentaerythritol-tetrakis(beta-lauryl-thio-propionate).

The antioxidant content is preferably in the range of 0.1 to 10 parts by mass and more preferably in the range of 1.5 to 5 parts by mass with respect to 100 parts by mass of the olefin resin component. If the content is less than 0.1 part by mass, the effect of improving heat resistance is easily lowered. If the content is more than 10 parts by mass, the antioxidant easily blooms.

Examples of the lubricant include a stearic acid.

The lubricant content is preferably within the range of 0.1 to 10 parts by mass and is more preferably within the range of 2 to 5 parts by mass with respect to 100 parts by mass of the olefin resin component. If the content is less than 0.1 part by mass, it is difficult for the lubricant to produce the effect of a lubricating property. On the other hand, if the content is more than 10 parts by mass, the antioxidant easily blooms.

Examples of the copper inhibitor include a copper inhibitor of triazole series, a commercially available product of which is CDA-1 manufactured by ADEKA CORPORATION. The copper inhibitor content is preferably in the range of 0.5 to 10 parts by mass and more preferably in the range of 1 to 5 parts by mass with respect to 100 parts by mass of the olefin resin component.

In order to produce the composition for a flame-retardant silane-crosslinked olefin resin according to the preferred embodiment of the present invention, the above-described ingredients are blended and kneaded. At this time, it is preferable that the polypropylene elastomer does not exist in a batch in which the silane-grafted polyethylene is to be prepared. To be specific, the polypropylene elastomer is contained in a batch other than the silane-grafted polyethylene-containing batch, and after the completion of the preparation of the silane-grafted polyethylene, the batches are kneaded, by which the silane-grafted polyethylene and the polypropylene elastomer are kneaded.

This is because if the polypropylene elastomer exists in the silane-grafted polyethylene-containing batch, the polypropylene elastomer is decomposed by the free-radical generating agent existing in the batch at the time of silane grafting the very low-density polyethylene in the batch, which lowers the effect of the addition of the polypropylene elastomer.

Therefore, a method for producing the flame-retardant silane-crosslinked olefin resin according to the preferred embodiment of the present invention is distinguished by separately preparing the silane-grafted polyethylene-containing batch and the polypropylene elastomer-containing batch, and then mixing them together. This distinguishing feature allows the polypropylene elastomer to be contained in the resin without being decomposed by the free-radical generating agent, which helps the composition to improve in flexibility and gasoline resistance.

In addition, since the composition for a flame-retardant silane-crosslinked olefin resin according to the preferred embodiment of the present invention contains the metal hydroxide as a flame retardant which generally contains water to easily hydrolyze the silane coupling agent in the silane-grafted polyethylene, it is desirable that contact between the metal hydroxide and the silane-grafted polyethylene is made at a time close to a molding step of the method. Hence, the metal hydroxide is contained in the batch other than the silane-grafted polyethylene-containing batch.

Accordingly, the method according to the preferred embodiment of the present invention includes the steps of kneading the silane-grafted polyethylene-containing batch which contains the silane-grafted polyethylene which is made by graft polymerization of the very low-density polyethylene having the density of 0.880 to 0.895 g/cm$^3$ with the silane coupling agent in the presence of the free-radical generating agent, the flame retardant-containing batch which is constituted of an olefin resin component which contains the polypropylene elastomer, and the metal hydroxide, and a batch which is constituted of an olefin resin and the silane crosslinking catalyst, molding the composition of the kneaded batches, and subjecting the molded composition to water crosslinking.

The silane-grafted polyethylene-containing batch, the flame retardant-containing batch, and the catalyst-containing batch are separately prepared before the molding step. Each prepared batch is extruded and formed into pellets. The three ingredients of the silane-grafted polyethylene-containing batch, the metal hydroxide-containing batch, and the catalyst-containing batch are separated before the molding step, and in the molding step, the three ingredients are kneaded for the first time. In other words, the silane-grafted polyethylene in the silane-grafted polyethylene-containing batch is kneaded for the first time with the water in the metal hydroxide in the flame retardant-containing batch in the molding step.

In order to knead the three ingredients, a generally used kneader such as a Banbury mixer, a pressure kneader, a kneading extruder, a twin screw extruder and a roll is preferably used. The three ingredients may be dry blended before kneaded preferably by using a generally used tumbler. A heating temperature during kneading is such a temperature that the resin flows, and is preferably a commonly applied temperature, e.g., temperatures of 100° C. to 250° C. A kneading time is preferably within 10 minutes.

The composition obtained by kneading the three ingredients is molded immediately after kneading, and thereafter, the molded composition is subjected to water crosslinking. The molded composition is subjected to water crosslinking preferably by being subjected to vapor or water. The water crosslinking is preferably performed at temperatures of ordinary temperature to 90° C. for 48 or fewer hours and is more preferably performed at temperatures of 60° C. to 80° C. for 12 to 24 hours.

The degree of cross-linkage of the olefin resin obtained by being subjected to the water crosslinking is preferably 60% or more in view of heat resistance. In other words, the gel content is preferably 60% or more and more preferably 65% or more. The degree of cross-linkage may be adjusted by adjusting the grafting amount of the silane coupling agent onto the olefin resin, the kind and content of the silane crosslinking catalyst, water crosslinking conditions (temperature, time), and other factors.

In kneading, a mass ratio of the flame retardant-containing batch to the silane-grafted polyethylene-containing batch is preferably within the range of 50:50 to 80:20 and is more preferably within the range of 60:40 to 70:30. If the silane-grafted polyethylene-containing batch content is less than 20% by mass, the degree of cross-linkage of the olefin resin obtained by being subjected to the water crosslinking is easily lowered, and accordingly the olefin resin easily swells with gasoline. On the other hand, if the flame retardant-containing batch content is less than 50% by mass, the olefin resin cannot show sufficient flame retardancy.

The catalyst-containing batch content is preferably within the range of 2.5 to 10 parts by mass and is more preferably within the range of 3 to 7 parts by mass with respect to 100 parts by mass of a component which is constituted of the silane-grafted polyethylene-containing batch and the flame retardant-containing batch. If the catalyst-containing batch content is less than 2.5 parts by mass, the degree of cross-linkage of the olefin resin obtained by being subjected to the water crosslinking is easily lowered, and accordingly heat resistance is easily lowered. If the content is more than 10 parts by mass, the degree of cross-linkage is not easily increased by the excessive addition of the catalyst-containing batch, and the excessively added batch easily causes asperities to be formed on the product surface.

The flame retardant-containing batch is prepared by adding the metal hydroxide to the olefin resin component which contains the polypropylene elastomer, and heat-kneading the prepared batch preferably with the use of an extruder. Very low-density polyethylene is preferably contained in the olefin resin component so that the flame retardant-containing batch can easily mix with the silane-grafted polyethylene-containing batch. The density of the very low-density polyethylene is preferably in the range of 0.880 to 0.895 g/cm$^3$ because it is preferable the very low-density polyethylene has a density close to the very low-density polyethylene which is contained in the silane-grafted polyethylene-containing batch. The metal hydroxide content is preferably in the range of 100 to 900 parts by mass with respect to 100 parts by mass of the olefin resin component in the flame retardant-containing batch. The various additives which are to be added as necessary are added preferably to the flame retardant-containing batch.

The catalyst-containing batch is prepared by adding the silane crosslinking catalyst to the olefin resin, and heat-kneading the prepared batch preferably with the use of an extruder. As the olefin resin contained in the catalyst-containing batch, the same kind of olefin resin as contained in the silane-grafted polyethylene-containing batch can be used. To be specific, very low-density polyethylene is preferably used so that catalyst-containing batch can easily mix with the silane-grafted polyethylene-containing batch.

The composition for a flame-retardant silane-crosslinked olefin resin according to the preferred embodiment of the present invention can be used in various molded products, and is favorably used especially in a molded product to be used in a place where heat resistance, flame retardancy, flexibility and gasoline resistance are required. Examples of the molded product include a covering material of an insulated wire for an automobile, especially of an insulated wire to be used in a place such as an engine room where heat resistance and gasoline resistance are required of the insulated wire. Flexibility is also required of the insulated wire for an automobile so that wiring can be carried out easily. In addition, the molded product is preferably used as a covering material of an insulated wire in a high-voltage power cable.

Next, a description of an insulated wire according to the preferred embodiment of the present invention is provided.

The insulated wire according to the preferred embodiment of the present invention includes the above described composition for a flame-retardant silane-crosslinked olefin resin, and a conductor covered with the composition. The diameter, the material and other properties of the conductor are not specifically limited and may be determined depending on the intended use. In addition, the thickness of the insulated covering material is not specifically limited and may be determined considering the conductor diameter. The insulated wire according to the preferred embodiment of the present invention can be favorably used as an insulated wire for an automobile, or an insulated wire in a high-voltage power cable. Examples of the high-voltage power cable include a high-voltage power cable which has a configuration such that a bunch of insulated wires including the insulated wire according to the preferred embodiment of the present invention are covered with a metallic shielding layer which is preferably made of a copper tape, and the metallic shielding layer is covered with a sheath.

In the insulated wire according to the preferred embodiment of the present invention, the degree of cross-linkage of the olefin resin which covers the conductor is preferably 60% or more and more preferably 65% or more. The degree of cross-linkage may be adjusted by adjusting the grafting amount of the silane coupling agent onto the olefin resin, the kind and content of the silane crosslinking catalyst, water crosslinking conditions (temperature, time), and other factors.

The production of the insulated wire according to the preferred embodiment of the present invention preferably includes heat-kneading the above described silane-grafted polyethylene-containing batch, flame retardant-containing batch and catalyst-containing batch, extrusion-covering the conductor with the composition of the kneaded batches, and then subjecting the composition to water crosslinking.

In the kneading step, the batches in pellet form are blended preferably with the use of a mixer or an extruder. In the covering step, the conductor is extrusion-covered with the composition of the kneaded batches preferably by using a generally used extrusion molding machine. In the crosslinking step after the covering step, the composition covering the conductor of the insulated wire is subjected to water vapor or water. The crosslinking is preferably performed at temperatures of ordinary temperature to 90° C. for 48 or fewer hours and is more preferably performed at temperatures of 60° C. to 80° C. for 12 to 24 hours.

EXAMPLES

A description of the present invention will now be specifically provided with reference to examples. However, the present invention is not limited thereto.

(Material used, Manufacturer, and Other Information)

Materials used in the examples and comparative example are provided be low along with their manufacturers, trade names, and other information.

Polyethylene <1>[manuf.: DuPont Dow Elastomers Japan KK, trade name: Engage 7256, density=0.885 g/cm$^3$, MFR=2 g/10 min, Mw/Mn=2.8]

Polyethylene <2>[ manuf.: DuPont Dow Elastomers Japan KK, trade name: Engage 8556, density=0.870 g/cm$^3$, MFR=2 g/10 min, Mw/Mn=2.9]

Polypropylene elastomer (PP elastomer) [manuf.: Japan Polypropylene Corporation, trade name: NEWCON NAR6, density=0.890 g/cm$^3$]

Magnesium hydroxide [manuf.: Kyowa Chemical Industry Co., Ltd., trade name: KISUMA 5]

Silane coupling agent [manuf.: Dow Corning Toray Co., Ltd., trade name: SZ6300]

Dicumyl peroxide (DCP) [manuf.: NOF CORPORATION, trade name: PERCUMYL D]

Tin catalyst (dibutyltin dilaurate) [manuf.: ADEKA CORPORATION, trade name: Mark BT-1]

Examples 1 to 5 and Comparative Example 1

(Preparation of Silane-Grafted polyethylene-Containing Batch)

The silane-grafted polyethylene-containing batches for Examples 1 to 5 and Comparative Example 1 were each prepared as follows: the A-materials at the mass ratio shown in Table 2 were charged into a twin screw kneading extruder and were heat-kneaded at 200° C. for 2 minutes, and then the kneaded composition was formed into a pellet.

(Preparation of Flame Retardant-Containing Batch)

The flame retardant-containing batches for Examples 1 to 5 and Comparative Example 1 were each prepared as follows: the B-materials at the mass ratio shown in Table 2 were charged into a twin screw kneading extruder and were heat-kneaded at 200° C. for 2 minutes, and then the kneaded composition was formed into a pellet.

(Preparation of Catalyst-Containing Batch)

The catalyst-containing batches for Examples 1 to 5 and Comparative Example 1 were each prepared as follows: the C-materials at the mass ratio shown in Table 2 were charged into a twin screw kneading extruder and were heat-kneaded at 200° C. for 2 minutes, and then the kneaded composition was formed into a pellet.

(Preparation of Insulated Wire)

The insulated wires according to Examples 1 to 5 and Comparative Example 1 were each prepared as follows: the silane-grafted polyethylene-containing batch (the A-materials), the flame retardant-containing batch (the B-materials), and the catalyst-containing batch (the C-materials) having the respective mass ratios shown in Table 2 were charged into a twin screw extruder to be heat-kneaded by using a hopper in the extruder at 200° C. for 2 minutes, and then a conductor having an external diameter of 2.4 mm was extrusion-covered with thus-prepared composition of the kneaded batches as an insulator having a thickness of 0.7 mm (i.e., the external diameter of the insulated wire after the extrusion-covering was 3.8 mm). Then, the composition was subjected to water crosslinking in a bath at a high humidity of 90% and at a high temperature of 85° C. for 24 hours.

Evaluations of the obtained insulated wires were made in terms of flexibility and gasoline resistance. In addition, evaluations of the obtained insulated wires were made in terms of product properties, i.e., evaluations of the obtained insulated wires in terms of surface appearance after extrusion was made, and measurements of tensile strength and tensile elongation, and gel contents of the obtained insulated wires were obtained. The results are shown in Table 2. In addition, descriptions of the evaluation method and the measurement method are provided below.

(Evaluation of Flexibility)

The evaluations of the insulated wires were made in terms of flexibility by the touch when bending the insulated wires by hands. To be more specific, the insulated wire which had a good feel was regarded as passed, and the insulated wire which had a bad feel was regarded as failed.

(Evaluation of Gasoline Resistance)

The evaluations of the insulated wires were made in terms of gasoline resistance in accordance with ISO6722-11-1. To be specific, the insulated wires were each immersed in ISO1817 gasoline (a liquid C) at 23±5° C. for 20 hours, removed from the gasoline to wipe the gasoline off their surfaces, dried at room temperature for 30 minutes, and measured for external diameter within 5 minutes after the drying step. The insulated wire which had the rate of change of the external diameter of 15% or less was regarded as passed, the rate of change being calculated by the following expression (Expression 1). In addition, the insulated wires were each wound around a stipulated mandrel and checked for cracking.

Rate of change=(External diameter before immersion−External diameter after immersion)/(External diameter before immersion)×100(%)   (Expression 1)

(Evaluation of Property)

(Evaluation of Surface Appearance After Extrusion)

The insulated wires were each checked visually for asperities, roughness and bubbles on an entire surface and a cross section. The insulated wire which is free from asperities, roughness and bubbles was evaluated as "Good".

(Tensile Strength and Tensile Elongation)

The measurements of tensile strength and tensile elongation of the obtained insulated wires were obtained by a tensile test in accordance with JIS C 3005. To be specific, the insulated wires were, after the conductors were removed therefrom, each cut to a length of 150 mm, and tubular test pieces including only the insulating covering materials were obtained. Then, at a room temperature of 23±5° C., the both ends of each test piece were attached to chucks of a tensile tester and were pulled at a tensile speed of 200 mm/min, and the load and elongation at the times of break of each test piece were measured.

(Gel Content)

The gel contents of the obtained insulated wires were obtained in accordance with JASO-D608-92. To be specific, about 0.1 g of test samples of the insulators of the insulated wires were each weighed out and put in test tubes, to which 20 ml xylene was added, and then, the test samples were each heated in a constant temperature oil bath at 120° C. for 24 hours. Then, the test samples were each taken out from the test tubes to be dried in a dryer at 100° C. for 6 hours. The dried test samples were each cooled to a room temperature and precisely weighed. The percentages of the masses of the test samples after the test to the masses of the test samples before the test define the gel contents. The standard of the gel content is 50% or more. The gel content is generally used for crosslinked wires as an index of the water crosslinking state.

TABLE 2

|  |  | Example | | | | | | | | |
|---|---|---|---|---|---|---|---|---|---|---|
|  |  | 1 | | | 2 | | | 3 | | |
| Material ratio (Mass ratio) | | A:B:C = 37:63:3.5 | | | A:B:C = 31:69:3 | | | A:B:C = 44:56:4 | | |
|  |  | A-materials | B-materials | C-materials | A-materials | B-materials | C-materials | A-materials | B-materials | C-materials |
| Composition | Polyethylene<1> | 70 | — | 100 | 60 | — | 100 | 80 | — | 100 |
|  | Polyethylene<2> | — | 25 | — | — | 30 | — | — | 15 | — |
|  | PP elastomer | — | 5 | — | — | 10 | — | — | 5 | — |
|  | Magnesium hydroxide | — | 90 | — | — | 90 | — | — | 90 | — |
|  | Silane coupling agent | 3.5 | — | — | 3 | — | — | 4 | — | — |
|  | DCP | 0.07 | — | — | 0.06 | — | — | 0.08 | — | — |
|  | Tin catalyst | — | — | 3 | — | — | 2 | — | — | 3 |
| Evaluation | Flexibility | Good | | | Good | | | Good | | |
|  | Gasoline Resistance (%) | 14 (Passed) | | | 7 (Passed) | | | 9 (Passed) | | |
| Property | Tensile strength (MPa) | 15 | | | 14 | | | 16 | | |
|  | Elongation (%) | 400 | | | 450 | | | 370 | | |
|  | Surface appearance after extrusion | Good | | | Good | | | Good | | |
|  | Gel content (%) | 68 | | | 70 | | | 72 | | |

|  |  | Example | | | | | | Comparative Example | | |
|---|---|---|---|---|---|---|---|---|---|---|
|  |  | 4 | | | 5 | | | 1 | | |
| Material ratio (Mass ratio) | | A:B:C = 27:73:2.5 | | | A:B:C = 49:51:4.5 | | | A:B:C = 36:64:3.5 | | |
|  |  | A-materials | B-materials | C-materials | A-materials | B-materials | C-materials | A-materials | B-materials | C-materials |
| Composition | Polyethylene<1> | 50 | — | 100 | 90 | — | 100 | 70 | — | 100 |
|  | Polyethylene<2> | — | 30 | — | — | 5 | — | — | 30 | — |
|  | PP elastomer | — | 20 | — | — | 5 | — | — | — | — |
|  | Magnesium hydroxide | — | 90 | — | — | 90 | — | — | 90 | — |
|  | Silane coupling agent | 2.5 | — | — | 4.5 | — | — | 3.5 | — | — |
|  | DCP | 0.05 | — | — | 0.09 | — | — | 0.07 | — | — |
|  | Tin catalyst | — | — | 3 | — | — | 4.5 | — | — | 3 |
| Evaluation | Flexibility | Good | | | Good | | | Good | | |
|  | Gasoline Resistance (%) | 12 (Passed) | | | 8.5 (Passed) | | | 18 (Failed) | | |
| Property | Tensile strength (MPa) | 15 | | | 17 | | | 12 | | |
|  | Elongation (%) | 400 | | | 520 | | | 510 | | |
|  | Surface appearance after extrusion | Good | | | Good | | | Good | | |
|  | Gel content (%) | 60 | | | 74 | | | 68 | | |

According to Table 2, it is shown that the insulated wire according to the comparative example is inferior in gasoline resistance. It can be considered that gasoline resistance of the resin composition is lowered because the insulated wire according to the comparative example contains no polypropylene elastomer in the resin composition that is the wire covering material, and the silane-grafted very low-density polyethylene is used instead in order to improve flexibility of the insulated wire.

In contrast, it is shown that the insulated wires according to the present examples are excellent in flexibility and gasoline resistance. This is because each of the insulated wires according to the present examples is prepared by extrusion-covering the conductor with the resin composition which contains the silane-grafted polyethylene made by graft polymerization of the very low-density polyethylene having the density of 0.880 to 0.895 g/cm³ with the silane coupling agent, the polypropylene elastomer, the metal hydroxide and the silane crosslinking catalyst, and then subjecting the composition to water crosslinking after the extrusion-covering step.

In addition, concerning the property evaluations, it is shown that the insulated wires according to the present examples are excellent in surface appearance after extrusion, tensile strength and tensile elongation, and have favorable degrees of cross-linkage which are indicated by the gel content values. Hence, it is clear from the property evaluations that the insulated wires according to the present examples have no problem in product quality.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A composition for a flame-retardant silane-crosslinked olefin resin, the composition comprising:
    silane-grafted polyethylene which is made by graft polymerization of very low-density polyethylene having a density of 0.880 to 0.895 g/cm³ with a silane coupling agent;
    a polypropylene elastomer;
    metal hydroxide; and
    a silane crosslinking catalyst.

2. The composition for a flame-retardant silane-crosslinked olefin resin according to claim 1, wherein the metal hydroxide content is 50 to 250 parts by mass with respect to 100 parts by mass of an olefin resin component which comprises:

45 to 85% by mass of the silane-grafted polyethylene which is made by the graft polymerization of the very low-density polyethylene having the density of 0.880 to 0.895 g/cm³ with the silane coupling agent; and 20 to 4% by mass of the polypropylene elastomer, and the silane crosslinking catalyst content is 0.05 to 0.35 parts by mass with respect to 100 parts by mass of the olefin resin component.

3. The composition for a flame-retardant silane-crosslinked olefin resin according to claim 1, wherein the olefin resin component further comprises one or more than one kind of very low-density polyethylene having a density of 0.880 to 0.895 g/cm³.

4. The composition for a flame-retardant silane-crosslinked olefin resin according to claim 1, wherein the very low-density polyethylene comprises metallocene polyethylene.

5. The composition for a flame-retardant silane-crosslinked olefin resin according to claim 1, wherein the very low-density polyethylene has a melt flow rate (MFR) in the range of 0.5 to 5 (g/10 min).

6. The composition for a flame-retardant silane-crosslinked olefin resin according to claim 1, wherein the very low-density polyethylene has a molecular weight distribution (Mw/Mn) in the range of 2.7 to 3.5.

7. The composition for a flame-retardant silane-crosslinked olefin resin according to claim 1, further comprising 1 to 5 parts by mass of a silicone oil with respect to 100 parts by mass of the olefin resin component.

8. An insulated wire comprising the composition for a flame-retardant silane-crosslinked olefin resin according to claim 1, and a conductor which is covered with the composition.

9. A method for producing a flame-retardant silane-crosslinked olefin resin, the method comprising the steps of:

Kneading:

a batch comprising silane-grafted polyethylene which is made by graft polymerization of very low-density polyethylene having a density of 0.880 to 0.895 g/cm³ with a silane coupling agent in the presence of a free-radical generating agent;

a batch prepared by mixing:

one of a mixture of very low-density polyethylene having a density of 0.880 to 0.895 g/cm³ and a polypropylene elastomer, and a polypropylene elastomer; and a flame retardant which comprises metal hydroxide; and a batch prepared by mixing an olefin resin and a silane crosslinking catalyst;

molding a composition of the kneaded batches; and subjecting the molded composition to water crosslinking.

10. The method for producing a flame-retardant silane-crosslinked olefin resin according to claim 9, wherein a mass ratio of the flame retardant-containing batch to the silane-grafted polyethylene-containing batch is in the range of 50:50 to 80:20, and the catalyst-containing batch content is in the range of 2.5 to 10 parts by mass with respect to 100 parts by mass of a component which comprises the silane-grafted polyethylene-containing batch and the flame retardant-containing batch.

11. The method for producing a flame-retardant silane-crosslinked olefin resin according to claim 9, wherein the silane-grafted polyethylene-containing batch is prepared by heat-mixing the very low-density polyethylene, the silane coupling agent and the free-radical generating agent, the silane coupling agent content being 1 to 5 parts by mass with respect to 100 parts by mass of the very low-density polyethylene, and the free-radical generating agent content being 0.05 to 0.3 parts by mass with respect to 100 parts by mass of the very low-density polyethylene, the flame retardant-containing batch is prepared by mixing the one of the mixture and the polypropylene elastomer, and the metal hydroxide, the metal hydroxide content being 100 to 900 parts by mass with respect to 100 parts by mass of the one of the mixture and the polypropylene elastomer, and the catalyst batch is prepared by mixing the olefin resin and the silane crosslinking catalyst, the silane crosslinking catalyst content being 1 to 5 parts by mass with respect to 100 parts by mass of the olefin resin.

\* \* \* \* \*